July 31, 1962  J. DOLZA  3,046,960
INTERNAL COMBUSTION ENGINES
Filed Sept. 26, 1960  3 Sheets-Sheet 2
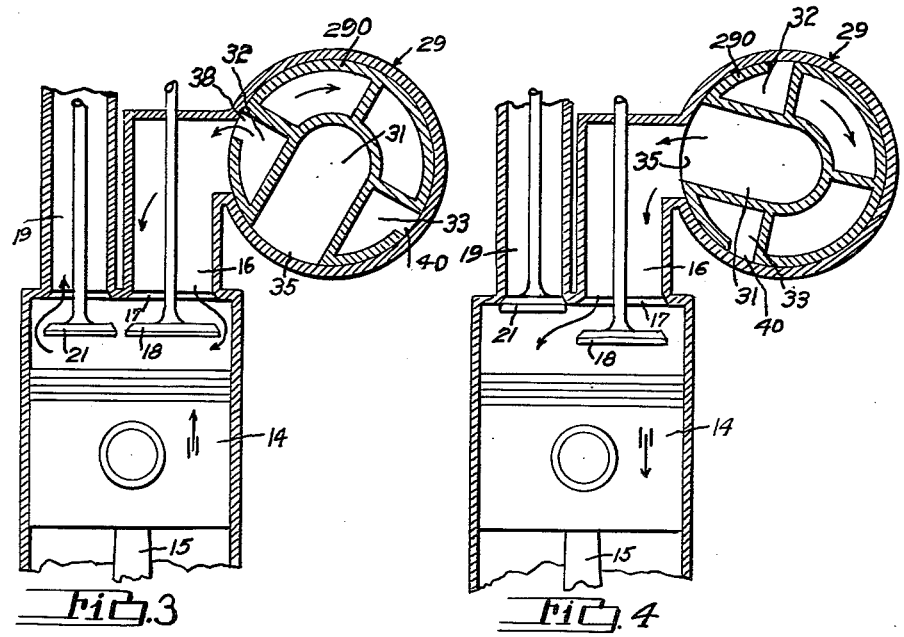
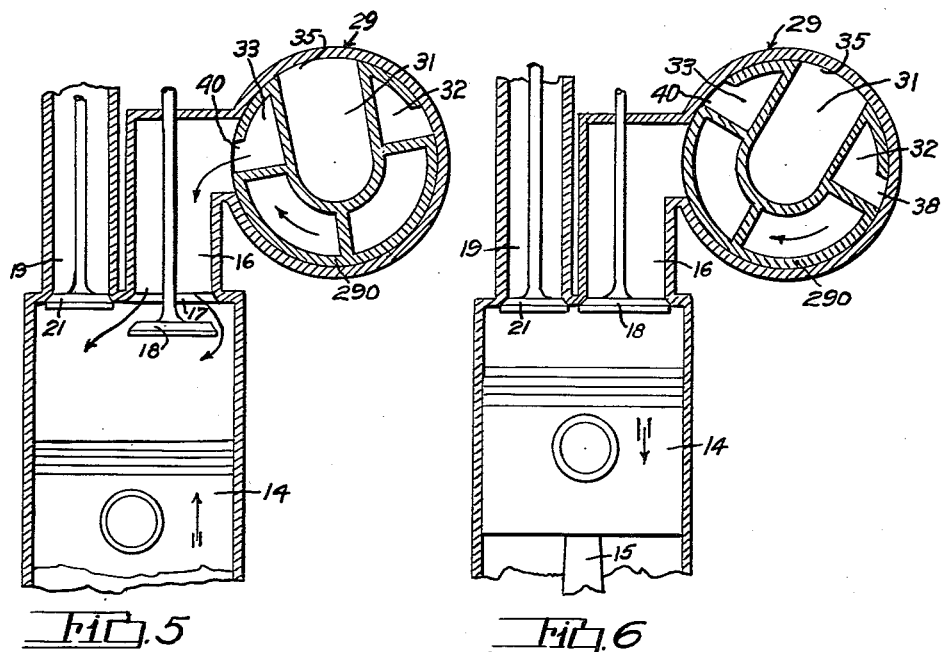
INVENTOR.
JOHN DOLZA
BY Everett F. Wright
ATTORNEY July 31, 1962  J. DOLZA  3,046,960
INTERNAL COMBUSTION ENGINES
Filed Sept. 26, 1960  3 Sheets-Sheet 3

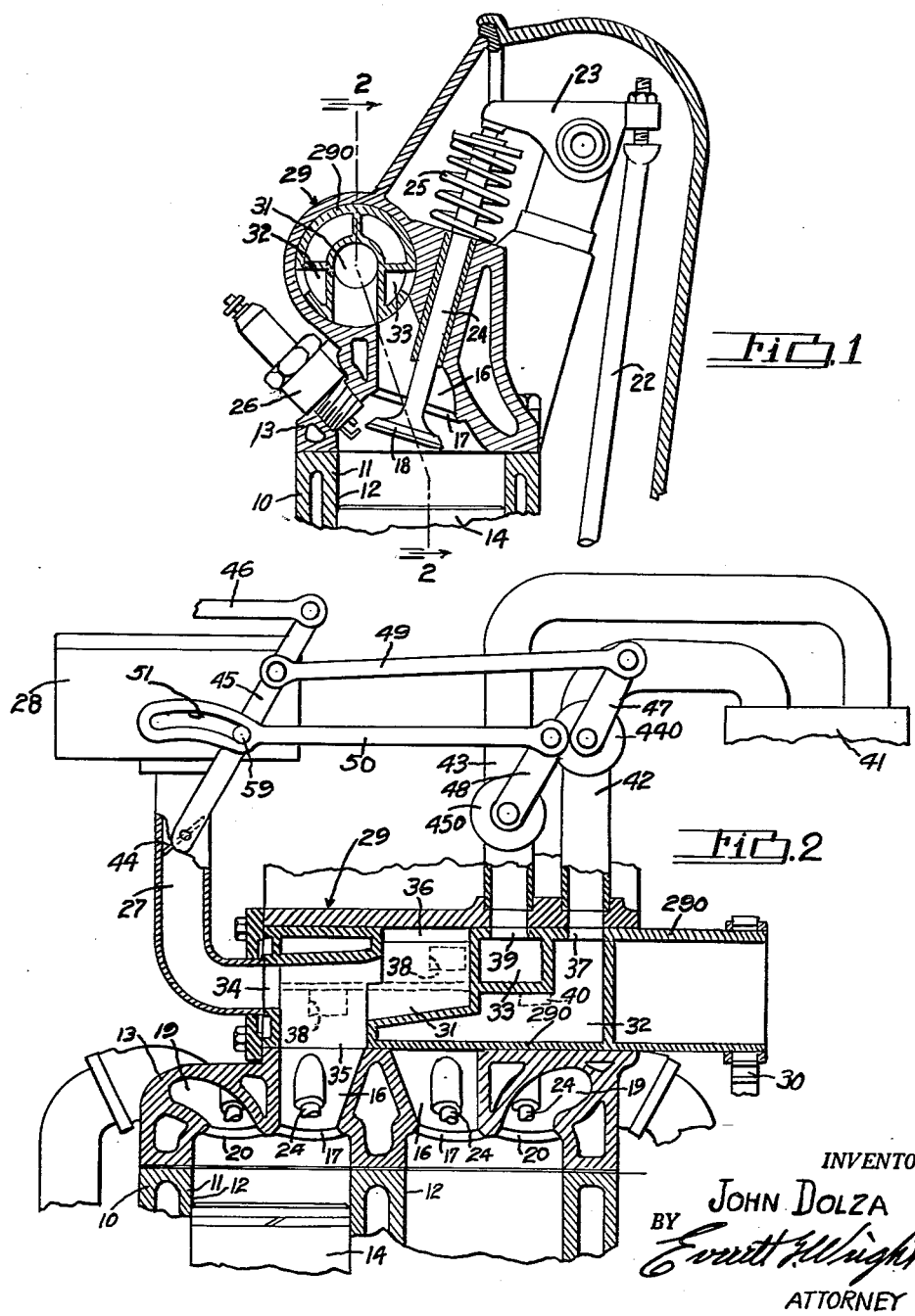

INVENTOR.
JOHN DOLZA
BY
ATTORNEY

3,046,960
INTERNAL COMBUSTION ENGINES
John Dolza, Fenton, Mich., assignor to Fiat Motor Company (Fiat S.p.A.), Turin, Italy
Filed Sept. 26, 1960, Ser. No. 58,456
3 Claims. (Cl. 123—76)

This invention relates to four-cycle internal combustion engines and more particularly to improved, simple and effective means for scavenging exhaust gases from the cylinder thereof, whereby residual exhaust gases in the cylinders are removed at the proper time and replaced by a charge of air and air-fuel mixture, whereby to assure substantially complete combustion of the air-fuel mixture, thereby resulting in the presence of a minimum of harmful gases and noxious odors in the engine exhaust, all while improving power output of the engine.

In the conventional engines, at idle, near idle and coasting, the exhaust contains large amounts of carbon monoxide and hydro-carbons due to the introduction of rather small charges of air-fuel mixture with respect to the large amount of residual exhaust gases in the combustion chamber.

Combustion can be improved by replacing part of the residual exhaust gases within the cylinder after the expansion stroke of the piston with air so that the residual exhaust gases in the combustion chamber at the beginning of the intake stroke of the piston is diluted with air, whereupon a more complete combustion of the mixture will take place when ignited at the end of the compression stroke of the piston.

As the throttle changes from idle to wide open, the pressure in the cylinder increases to above atmospheric. It is therefore an object of the invention to introduce air from a supply of compressed air into the cylinder during the exhaust stroke and the compression stroke under a pressure greater than the cylinder pressure existing during the respective strokes.

Another object of the invention is to provide valve means associated with the air-fuel intake system of the engine operating in timed relation with the cam shaft rotation for distributing the air-fuel mixture and compressed air through the intake ports of the proper cylinder and in proper timed relationship to the opening and closing of the intake and exhaust valves.

A further object of the invention is to provide a valve which will regulate a flow of compressed air into the cylinders during the early part of the piston compression stroke and during the latter part of the piston exhaust stroke, said air pressure being admitted to the cylinder through the intake port controlled by the intake valve which remains open during the early part of the piston compression stroke.

Other objects and advantages of the invention will be more fully understood by reference to the following detailed description taken in connection with the accompanying drawings, in which:

FIG. 1 is a fragmentary cross sectional view through a single cylinder of a four-cycle engine embodying the invention including a distributor valve for the distribution of air-fuel mixture and compressed air through the intake ports of the engine.

FIG. 2 is a fragmentary longitudinal sectional view taken on line 2—2 of FIG. 1.

FIG. 3 is a diagrammatic cross sectional view showing the position of a piston, intake valve, exhaust valve and distributor valve for the air-fuel mixture, air pressure and scavenging air, at the latter part of the exhaust stroke.

FIG. 4 is a view corresponding to FIG. 3 but showing the distributor valve position assumed during the engine intake stroke.

FIG. 5 is a view corresponding to FIG. 3, but showing the distributor valve position assumed during the engine compression stroke.

FIG. 6 is a view corresponding to FIG. 3 but showing the distributor valve position assumed during the engine expansion stroke.

Figure 8:
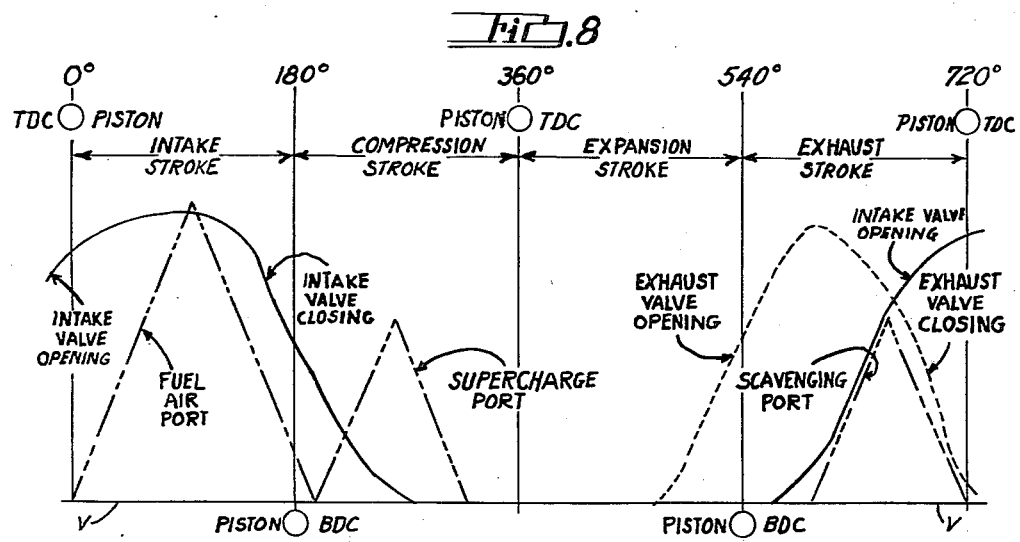
FIG. 8 is an engine valve operating diagram showing a preferred timing of the intake valve, exhaust valve, scavenging valve and air pressure valve related to piston location and crankshaft rotation through the four cycles of operation of a four-cycle engine.

The particular embodiment of the invention disclosed herein is illustrated in connection with a two-cylinder four-cycle engine. It is obvious that the invention is equally applicable to any number of cylinders in a four-cycle engine.

The four-cycle internal combustion engine is shown as having a cylinder block 10 including a cylinder 11 having a cylinder bore 12 therein, and a cylinder head 13. A piston 14 is reciprocatingly mounted in the cylinder bore 11 and is connected by a connecting rod 15 to the crankshaft, not shown. The cylinder head 13 is provided with an intake passage 16 having a port 17 opening into the cylinder bore 12, and controlled by an intake valve 18. The said head 13 also has an exhaust passage 19 having a port 20 opening into the cylinder bore 12 and controlled by an exhaust valve 21.

The intake and exhaust valves are operated in the conventional manner by a cam shaft, the cam shaft being driven by the engine crankshaft. Inasmuch as this construction is well known in the art, it need not be described or shown in the drawings. However, the timing of the opening and closing of the intake and exhaust valves by the cam shaft is accomplished through push rod 22 to rocker arm 23 acting on the outer end of the valve stem 24. A valve spring 25 urges the valve 18 closed. The usual spark plug 26 is employed to ignite the air-fuel mixture passing through the carburetor throat 27 from carburetor 28.

Mounted in the cylinder head 13 and communicating with the intake passage 16 is an air-fuel and compressed air distributor valve 29. The distributor valve 29, as herein illustrated and described, includes a rotary sleeve 290 which is driven in timed relation by the usual cam shaft (not shown) through a timing belt 30. The valve sleeve 290 includes three compartments or separate chambers, one chamber 31 for the air-fuel mixture, another chamber 32 for pressure scavenging air, and a third chamber 33 for pressure supercharging air. The air-fuel mixture chamber 31 of the distributor valve 29 has an end opening 34 leading to the carburetor throat 27 and has lateral discharge ports 35 and 36 in the wall of the rotary valve sleeve 290 which, when in certain positions of rotation, lead to the intake passages 16 of the two-cylinder engine illustrated. The chamber 32 of the distributor valve 29 is provided with an inlet port 37 and discharge ports 38 for discharging scavenging air under pressure into the two cylinders through intake passages 16 in timed sequence. The chamber 33 of the distributor valve 29 is provided with an inlet port 39 and discharge ports 40 for discharging the air pressure for supercharging into the cylinders through intake passages 16.

An air compressor is shown diagrammatically at 41 which supplies air under pressure through a tube 42 fitted into the inlet port 37 of scavenging air chamber 32 and through a tube 43 fitted into the inlet port 39 of supercharging air chamber 33. Air regulator valves 44O and 45O are arranged in the tubes 42 and 43 respectively for regulating the input of air to the two distribution chambers 32 and 33 responsive to throttle position.

A butterfly control valve 44 is located in the carburetor throat 27 and is controlled by an arm 45 which is connected to the accelerator pedal (not shown) by a link 46. Arms 47 and 48 are connected at one end through links 49 and 50 to the throttle control arm 45, the link 50 having a lost motion connection with the arm 45 through a slot 51. The said arms 47 and 48 are linked at their other ends to the air regulator valves 44O and 45O.

Figure 7:
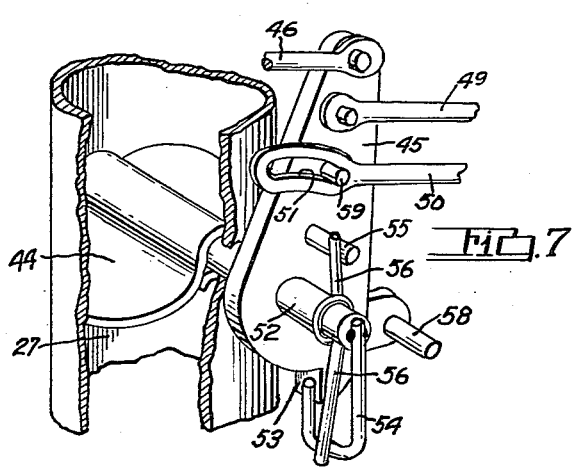
FIG. 7 is a fragmentary view partly in section showing in perspective the throttle control for the carburetor butterfly valve and regulating valves for control of the supply of compressed air to the distributor valve.

Referring now to FIG. 7, it will be noted that the arm 45 is rotatably mounted on the valve shaft 52 and is provided with a downwardly projecting bearing face 53 which contacts a link 54 fixed to the shaft 52. An upper projection 55 is provided on the arm 45, and a spring 56 acting against the projection 55 and the link 54, provides a driving connection for the butterfly valve 44 during its movement from closed position to wide open throttle, after which the fixed link 54 resists movement thereof by its engagement with a stop 58 on the carburetor throat housing and continued movement of the arm 45 further tensions the spring 56, moving the link 54 away from the bearing surface 53 and increasing the air pressure through the regulating valve 45O by engagement of the pin 59 at the left hand of the slot 51; thus the supercharging air pressure from the chamber 33 may be increased at wide open throttle without movement of the butterfly throttle valve 44 beyond its wide open throttle position.

Figure 9:
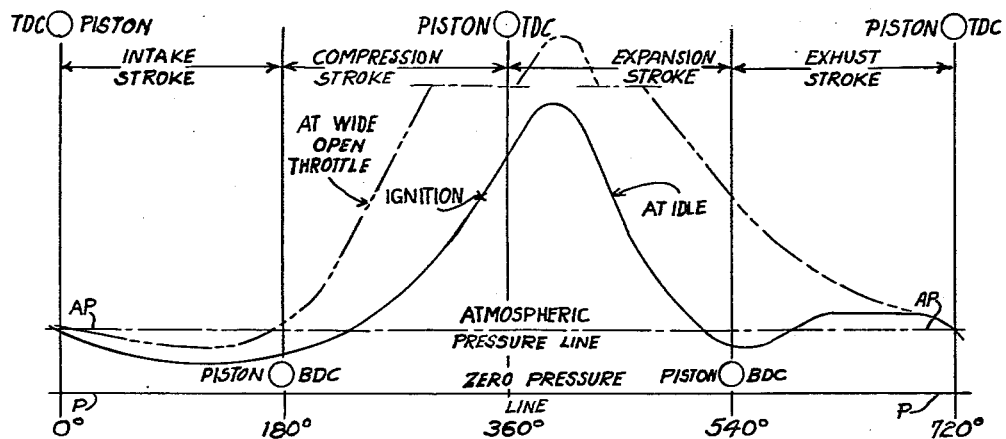
FIG. 9 is a cylinder pressure diagram showing the cylinder pressures related to absolute and atmospheric pressures occurring during the four cycles of operation of a four-cycle engine, the said FIG. 9 being disposed directly below FIG. 8 to admit of ready coordination of the cylinder pressures with the engine valve timing.

The operation of the distributing valve 29 will be best understood by reference to FIGS. 3 to 6 inclusive and to the valve opening and closing diagrams shown in FIG. 8 and the pressure diagram shown in FIG. 9. The exhaust stroke of the piston is illustrated in FIG. 3 wherein exhaust gases in the cylinder are removed by the scavenging air pressure in the chamber 32 flowing through the open intake port 17 and discharging the exhaust gases then residing in the cylinder through the open exhaust port 20, as indicated by the arrows, when the piston is moving toward TDC. When the piston starts its downward movement for the intake stroke, as illustrated in FIG. 4, the rotary valve sleeve 29O has moved clockwise into a position for the air-fuel mixture in chamber 31 to enter the cylinder through port 35, the exhaust valve 21 being closed. During the compression stroke as indicated in FIG. 5, when the piston is moving upwardly the intake valve remains open, the air-fuel mixture port is closed, and the compressed air in the supercharging chamber 33 flows through the port 40 admitting supercharging air under pressure to the cylinder 11; the intake valve 18 remaining open during the early part of the compression stroke, and the exhaust valve 21 being closed. During the expansion stroke of the piston, both intake and exhaust valves are closed and the opening 35, ports 38 and 40 are closed, as indicated in FIG. 6.

Referring now to the engine valve operating diagram shown in FIG. 8, the abscissa of the diagram indicates the intake, compression, expansion and exhaust strokes of the piston of a four-cycle engine occurring sequentially during 720 degrees of crankshaft rotation. The top dead center, TDC, of the engine is at 0 degrees, 360 degrees and 720 degrees of crankshaft rotation, and bottom dead center, BDC, of the engine piston is at 180 and 540 degrees of crankshaft rotation, as indicated at said points of crankshaft rotation. The ordinate of the diagram indicates the valve openings. The opening and closing of the engine intake valve is shown in full lines, the opening and closing of the engine exhaust valve is shown by the dotted lines, the opening and closing of the air-fuel port is shown by the dash and two dot lines, the opening and closing of the supercharging ports being shown by dash and three dot lines, and the opening and closing of the scavenging valve being shown by the dash and four dot lines, all related to the valve-closed base line V—V.

Directly below FIG. 8 and vertically aligned therewith is FIG. 9 showing a cylinder pressure diagram in which the abscissa of the diagram indicates the engine piston strokes and the crankshaft rotation as in FIG. 8. The ordinate in FIG. 9 shows absolute cylinder pressure during the four piston strokes represented by the full line curve related to the zero absolute pressure base line P—P, and atmospheric pressure represented by a dot and dash line AP—AP paralleling the said base line P—P. The pressure curve at idle engine speed is shown by full lines and the pressure curve at wide open throttle is shown by the dash and two dot lines.

In the instant invention, at idle, near idle and coasting, combustion is greatly improved by replacing part of the residual exhaust normally remaining in the cylinder by the introduction of scavenging air under pressure during the latter part of the exhaust stroke. As the throttle is opened the pressure in the cylinder is increased and consequently the pressure of the scavenging air must also be increased to scavenge the cylinders of their increased exhaust pressure. Therefore, the scavenging air pressure regulator 44O is connected to the throttle control arm 49 so as to increase scavenging air pressure as the cylinder pressure increases.

Supercharging is required when more power is demanded from the engine than is obtained with a fully open throttle. The regulator valve 45O is connected to the throttle control arm 50 in such a manner that the regulator valve 45O can be caused to create greater supercharging pressures after the throttle valve has reached its fully open position.

By reference to FIGS. 5 and 8, it will be noted that the supercharging air is admitted to the cylinder during the early part of the compression stroke through the engine intake valve and during the latter part of the closing of the intake valve.

Although but a single embodiment of the invention has been disclosed and described herein, it is obvious that many changes may be made in the size, shape, arrangement and detail of the various elements of the invention without departing from the spirit and scope thereof as defined by the appended claims.

I claim:

1. In a four-cycle internal combustion engine, a cylinder including a head forming a combustion chamber, a piston reciprocable in said cylinder, intake and exhaust passages to and from said combustion chamber, intake and exhaust valves for opening and closing said passages, a carburetor connected to said intake passage including a butterfly valve, and means for opening and closing said butterfly valve to accelerate and decelerate said engine, a movable valve member having an air-fuel chamber, a supercharging air pressure chamber, and a scavenging air pressure chamber, ports leading from said chambers to the intake passage to said cylinder, means operable in timed relation to the opening and closing of said intake and exhaust valves for positioning said movable valve whereby the port in said supercharging air pressure chamber communicates with said intake passage during the latter part of the closing of said intake valve, and the port in said scavenging air chamber communicates with said intake passage during the latter part of the closing of said exhaust valve, and separate means for controlling said supercharging air and said scavenging air to said movable valve member, said separate means being operable responsive to said means opening and closing the butterfly valve of said carburetor.

2. In a four-cycle internal combustion engine, a cylinder including a head forming a combustion chamber, a piston reciprocable in said cylinder, intake and exhaust passages to and from said combustion chamber, intake and exhaust valves for opening and closing said passages, a carburetor having a throat through which an air-fuel mixture is supplied to said intake passage, a butterfly throttle valve in said carburetor throat, a control arm for said butterfly valve, a distributor valve member having an air-fuel chamber, a supercharging air pressure chamber, and a scavenging air pressure chamber, ports leading from said chambers, means operable in timed relation to the opening and closing of said intake and exhaust valves for moving said distributor valve whereby the port in said supercharging air chamber communicates with said engine cylinder, and the port in said scavenging air chamber communicates with said engine cylinder, means for supplying compressed air to said supercharging air chamber and said scavenging air chamber, regulator valves for regulating the air supplied to said distributor valve, and control means for said regulator valves connected to said control arm for said butterfly valve, one of said regulator valves being controlled directly by said control arm and the other of said regulator valves having a lost motion connection with said control arm.

3. In a four-cycle internal combustion engine, a cylinder including a head forming a combustion chamber, a piston reciprocable in said cylinder, intake and exhaust passages to and from said combustion chamber, intake and exhaust valves for opening and closing said passages, a carburetor having a throat through which an air-fuel mixture is supplied to said intake passage, a butterfly throttle valve in said carburetor throat, a control arm for said butterfly valve, a distributor valve member having a supercharging air pressure chamber and a scavenging air pressure chamber, ports leading from said chambers, means operable in timed relation to the opening and closing of said intake and exhaust valves for moving said distributor valve whereby the port in said supercharging air chamber communicates with said engine cylinder and the port in said scavenging air chamber communicates with said engine cylinder, means for supplying compressed air to said supercharging air chamber and said scavenging air chamber, regulator valves for regulating the air supplied to said distributor valve, and control means for said regulator valves connected to said control arm for said butterfly valve, said control means for said regulator valve for said air supply to said supercharging air pressure chamber being operable only after said butterfly valve is fully opened.

References Cited in the file of this patent
UNITED STATES PATENTS

| 1,927,368 | Kjaer | Sept. 19, 1933 |
| 2,240,088 | Birkigt | Apr. 29, 1941 |
| 2,714,374 | Hennig | Aug. 2, 1955 |

FOREIGN PATENTS

| 21,782 | Great Britain | Oct. 15, 1908 |